US 6,719,346 B2

(12) United States Patent
Bettin et al.

(10) Patent No.: US 6,719,346 B2
(45) Date of Patent: *Apr. 13, 2004

(54) ATV WITH FENDER STORAGE COMPARTMENT

(75) Inventors: Ted Bettin, Thief River Falls, MN (US); Mark Esala, Newfolden, MN (US); Darren Holter, Thief River Falls, MN (US); Clifton Johnson, Red Lake Falls, MN (US); Craig Kennedy, St. Hillaire, MN (US)

(73) Assignee: Arctic Cat, Inc., Thief River Falls, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/346,740

(22) Filed: Jan. 15, 2003

(65) Prior Publication Data

US 2003/0111859 A1 Jun. 19, 2003

Related U.S. Application Data

(63) Continuation of application No. 09/685,995, filed on Oct. 11, 2000, now Pat. No. 6,533,339.

(51) Int. Cl.⁷ ............................................. B60G 11/06
(52) U.S. Cl. ...................... 296/37.1; 296/37.6; 296/181
(58) Field of Search ........................ 296/37.1, 37.6, 296/198, 136, 181, 37.13; 414/462; 150/166; 280/848

(56) References Cited

U.S. PATENT DOCUMENTS

| | | | | |
|---|---|---|---|---|
| 4,135,761 A | * | 1/1979 | Ward .......................... | 296/37.6 |
| 4,522,442 A | * | 6/1985 | Takenaka .................... | 296/37.1 |
| 4,619,476 A | * | 10/1986 | Kawasaki .................... | 296/37.1 |
| 4,660,880 A | * | 4/1987 | Bensch ........................ | 296/37.1 |
| 4,726,439 A | * | 2/1988 | Iwao et al. ................. | 296/37.1 |
| 4,789,195 A | * | 12/1988 | Fletcher ...................... | 296/37.1 |
| 4,802,682 A | * | 2/1989 | Yasuji ......................... | 296/37.1 |
| 5,060,748 A | * | 10/1991 | Iwai et al. .................. | 296/37.1 |
| 5,064,016 A | * | 11/1991 | Iwai et al. .................. | 296/37.1 |
| 5,076,387 A | * | 12/1991 | Oka ............................ | 296/37.1 |
| 5,083,632 A | * | 1/1992 | Saito et al. ................. | 296/37.1 |
| 5,421,645 A | * | 6/1995 | Young ......................... | 296/37.6 |
| 5,513,868 A | * | 5/1996 | Barr ............................ | 296/181 |
| 5,615,922 A | | 4/1997 | Blanchard | |
| 5,819,390 A | * | 10/1998 | Clare .......................... | 296/37.6 |
| 5,876,005 A | * | 3/1999 | Vasconi ..................... | 248/276.1 |
| 5,878,929 A | * | 3/1999 | Leonard ..................... | 224/401 |
| 6,003,923 A | * | 12/1999 | Scott et al. ................. | 296/37.6 |
| 6,030,018 A | * | 2/2000 | Clare et al. ................. | 296/37.6 |
| 6,079,741 A | * | 6/2000 | Maver ........................ | 296/37.6 |
| 6,129,401 A | | 10/2000 | Neag et al. | |
| 6,142,549 A | * | 11/2000 | Clare et al. ................. | 296/37.6 |
| 6,179,180 B1 | * | 1/2001 | Walker ....................... | 224/401 |
| 6,237,211 B1 | * | 5/2001 | Clare et al. ................. | 296/37.6 |
| 6,237,990 B1 | * | 5/2001 | Barbier et al. ............. | 296/37.1 |
| 2002/0033287 A1 | | 3/2002 | Bombardier | |

* cited by examiner

Primary Examiner—Kiran Patel
(74) Attorney, Agent, or Firm—Merchant & Gould, P.C.

(57) ABSTRACT

An all terrain vehicle is provided with one or more wheel fenders that double as storage compartments. The fenders define a hollow volume into which a variety of desired items can be placed for storage. An access opening provides access to the hollow volume. A door can be attached to releasably close the access opening. A door can be hinged such that it is readily accessible by a driver of the ATV while seated on the ATV.

1 Claim, 4 Drawing Sheets

ATV WITH FENDER STORAGE COMPARTMENT

TECHNICAL FIELD

The invention relates generally to off-road vehicles and more specifically to All Terrain Vehicles or ATVs. The invention relates more specifically to ATVs equipped with supplemental storage compartments.

BACKGROUND

ATVs serve a variety of functions for a variety of different people. An ATV typically has four wheels on two axles, although some vehicles have either five or six wheels. One or both axles can be driven. ATVs are designed for a single driver that straddles the vehicle and do not provide room for passengers.

Many ATVs are used for professional reasons. For example, a forester may use an ATV to patrol the portion of a forest he or she is responsible for. Farmers use ATVs for transporting and supporting irrigation and spraying equipment. Ranchers use ATVs for moving and controlling cattle, as well as for hauling feed for the cattle. Rescue personnel also use ATVs for reaching potential patients who would otherwise be stranded in rough terrain. ATVs can be used during the heat of summer and in the depths of a midwinter snowfall.

ATVs often are used in functional roles around the house. In wintertime, an ATV can be equipped with a blade for plowing snow. An ATV can be used to pull out small tree stumps. A popular option for ATVs is a dump bed that sits on the rear of the vehicle and can be used to haul bulk materials such as dirt and sand or other materials as desired.

For some, an ATV is purely a recreational vehicle that may be driven along a beach or through the woods on a Saturday afternoon. For others, an ATV has a more functional role. For example, a hunter may use an ATV to reach remote portions of a hunting ground that is too rough to reach by conventional vehicle and too remote to reach on foot. The ATV can be used to haul in supplies and gear and to haul out the day's bounty.

No matter the intended use of an ATV, one common denominator is a desire for maximizing available storage space. To address this, some ATV manufacturers offer a variety of supplemental storage bags as accessories. For example, a hunter may want an add-on scabbard adapted to hold a rifle. Rescue personnel may utilize add-on storage adapted to hold medical equipment.

These add-on storage bags often mount to the rear rack of an ATV, tying up valuable space. Thus, a need remains for an ATV having enhanced storage capability.

SUMMARY OF THE INVENTION

The present invention involves an off-road or all terrain vehicle that is provided with wheel fenders that double as storage compartments. The fenders define a hollow volume into which a variety of desired items can be placed for storage. These storage fenders can be configured and positioned as either front or rear wheel fenders. An off-road vehicle can be equipped with any combination of front and rear wheel storage fenders. A hinged door provides access to the hollow volume but shuts tightly to keep out the elements. The hinged door is readily accessible by a driver of the ATV while seated on the ATV.

Accordingly, the invention is found in an off-road vehicle fender that has front and rear panels that are configured or adapted to a wheel opening contour and are spaced apart. First and second side panels are connected to each of the front and rear panels and the front and rear panels and first and second side panels cooperate to form a storage compartment.

DETAILED DESCRIPTION

The present invention involves an off-road or all terrain vehicle that is provided with one or more wheel fenders that double as storage compartments. These storage compartment fenders can be positioned near the front wheels, the rear wheels or the front and rear wheels of the all terrain vehicle. Each of these fenders define a hollow volume into which a variety of desired items can be placed for storage. In a preferred embodiment, a hinged door provides access to the hollow volume but shuts tightly to keep out the elements. The hinged door is readily accessible by a driver of the ATV while seated on the ATV. Alternatively, the door may be attached to the storage fender in a variety of different ways or the storage fender may have an access opening lacking any cover or door.

Preferably, the fender has front and rear panels that are configured or adapted to a wheel opening contour. The front and rear panels are spaced apart to form a volume therebetween. The fender also has side panels that are connected to each of the front and rear panels to form a complete storage compartment.

Figure 1:
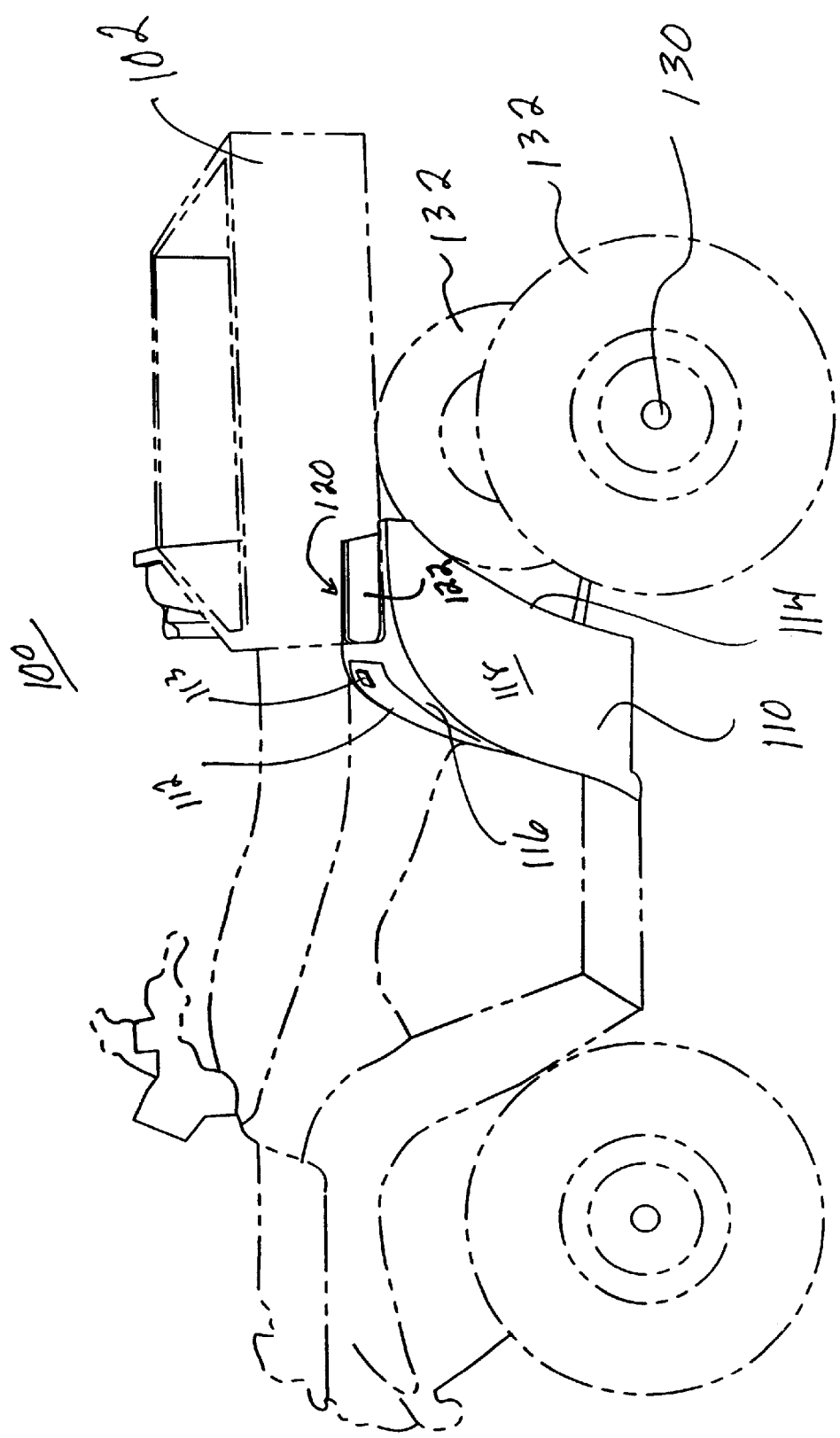
FIG. 1 is a side elevation view of an off-road or all terrain vehicle (shown in phantom) illustrating placement of a rear fender and access panel located in accordance with an embodiment of the present invention.

The invention is perhaps best understood in conjunction with the Figures. FIG. 1 is a side elevation of an ATV 100, shown in phantom, illustrating the placement of a storage fender 110 in accordance with the invention. The ATV 100 illustrated is seen as having a dump bin 102 in place of its customary rear rack. This is of course a particular embodiment of the invention, but the invention is certainly not limited to such.

The storage fender 110 as illustrated has a front panel 114 and a rear panel 116. In this, front and rear are arbitrary and do not necessarily relate to the front and rear of an all terrain vehicle. In a preferred embodiment, the front and rear panels 114, 116 are curved so as to form a contour that permits sufficient clearance between the storage fender 110 and the wheels 132.

Figure 3:
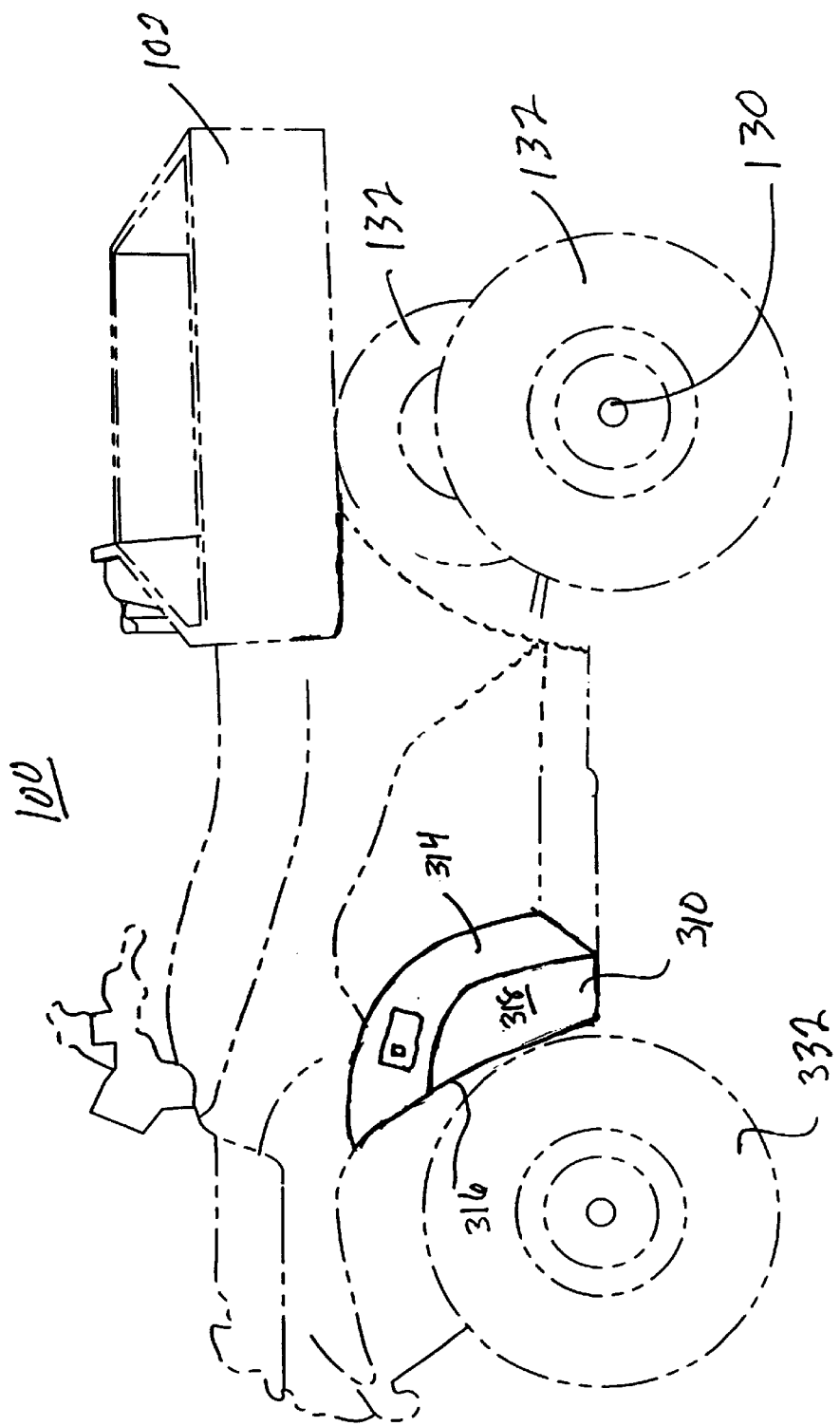
FIG. 3 is a side elevation view of an off-road or all terrain vehicle (shown in phantom) illustrating a front fender that has an access panel located in accordance with an embodiment of the present invention.
Figure 4:
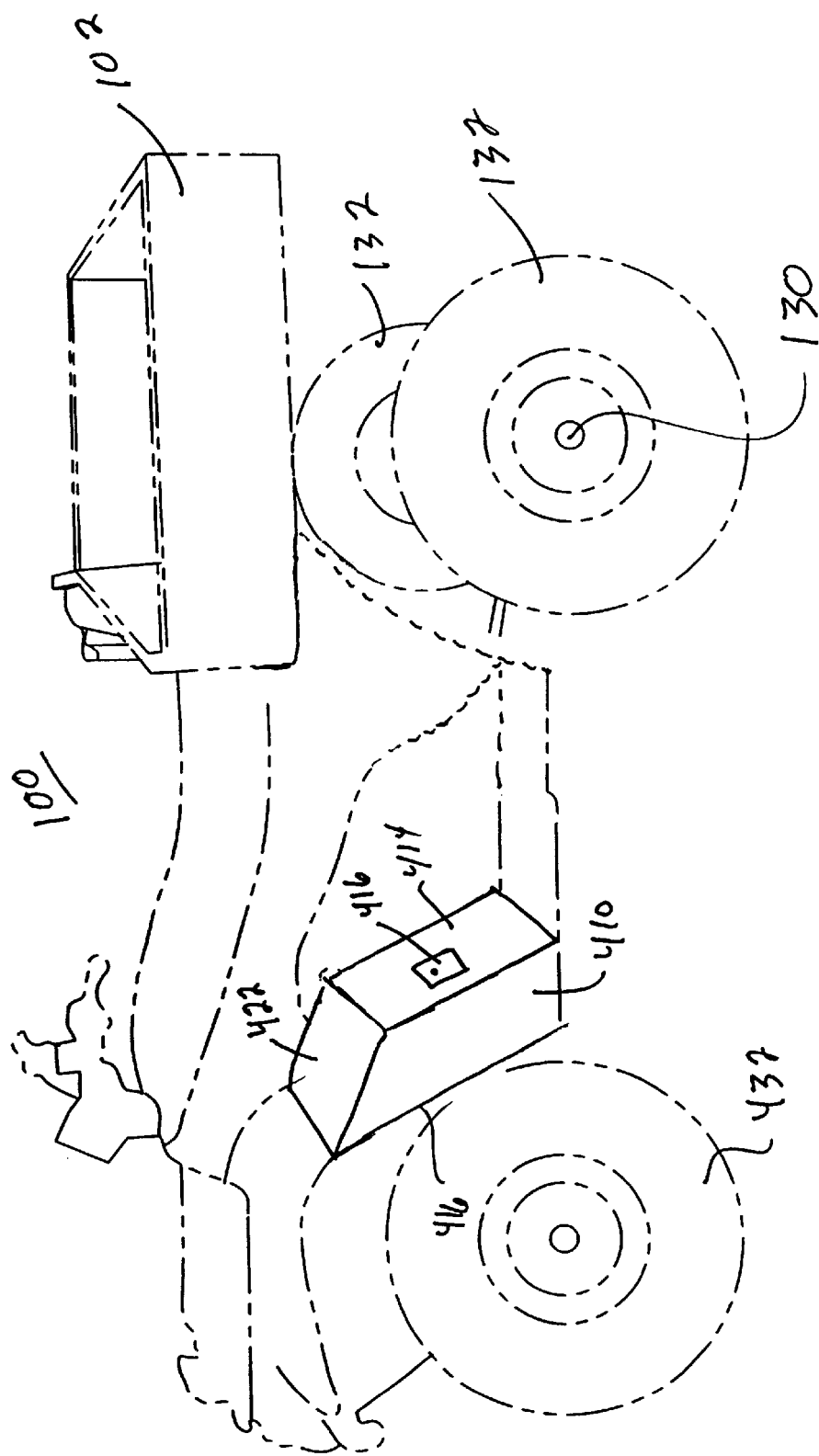
FIG. 4 is a side elevation view of an off-road or all terrain vehicle (shown in phantom) illustrating a front fender that has an access panel located in accordance with an embodiment of the present invention.

Alternatively, the front and rear panels 114, 116 can be flat or have any other geometric shape that provides enough storage space while maintaining sufficient wheel clearance, as well as being configured for use with either a front or rear of an ATV. For example, FIG. 3 illustrates an embodiment in which a front wheel storage fender 310 has curved front and rear panels 314, 316 while FIG. 4 shows a front wheel storage fender 410 having essentially linear or flat front and rear panels 414, 416. If the front panel 414 and rear panel 416 are essentially flat, the storage fender 410 can have a top panel 422. While a running board on one side of an off-road vehicle can provide a bottom to the storage fender 110, 210, 410, it is preferred that the storage fender employ a bottom panel (not illustrated).

It is envisioned that an ATV 100 can be equipped with any combination of the storage fenders 110, 310, 410 described herein. While an ATV 100 could have two front storage fenders and two rear storage fenders, it may be necessary to limit the ATV 100 to fewer storage fenders, depending on the space requirements of other accessories. For example, it may be necessary to not utilize one or both of the front storage fenders if the ATV 100 is equipped with a snowplow that has operational levers, etc. extending along one side of the ATV 100.

In the embodiment shown in FIG. 1, the storage fender 110 has a depression 122 on its upper surface to accommodate the dump bin 102. If the dump bin 102 is not present, the storage fender 110 can be substantially larger.

The first and second curved panels 114, 116 are preferably connected to first and second side panels 118 and 120 (not visible) to form a storage volume. While the storage fender 110 has been described herein as being formed from four distinct panels, it is preferred that the storage fender 110 be fashioned from a single piece of material. Alternatively, the storage fender 110 can be assembled from any number of distinct elements. This is a manufacturing decision easily handled by one of ordinary skill in the art.

Preferably, the storage fender 110 is a unitary molded plastic structure. A variety of plastics can be used, including polyethylene, polyvinyl chloride, polycarbonate, polypropylene and others. Of course, the storage fender 110 can also be fashioned out of metals such as aluminum or steel or even from wood should this be preferable for a particular application.

The storage fender 110 has an internal volume that is limited only by the dimensions of the particular ATV to which it is fitted. Preferably, the storage fender 110 has a front to back distance (between the first panel 114 and the rear panel 116) that is at least about 1 inch, preferably at least about 2 inches while the side to side distance (between the first and second side panels 118, 120) ranges between 1 and 12 inches, depending on the available space at the wheel well.

Figure 2:
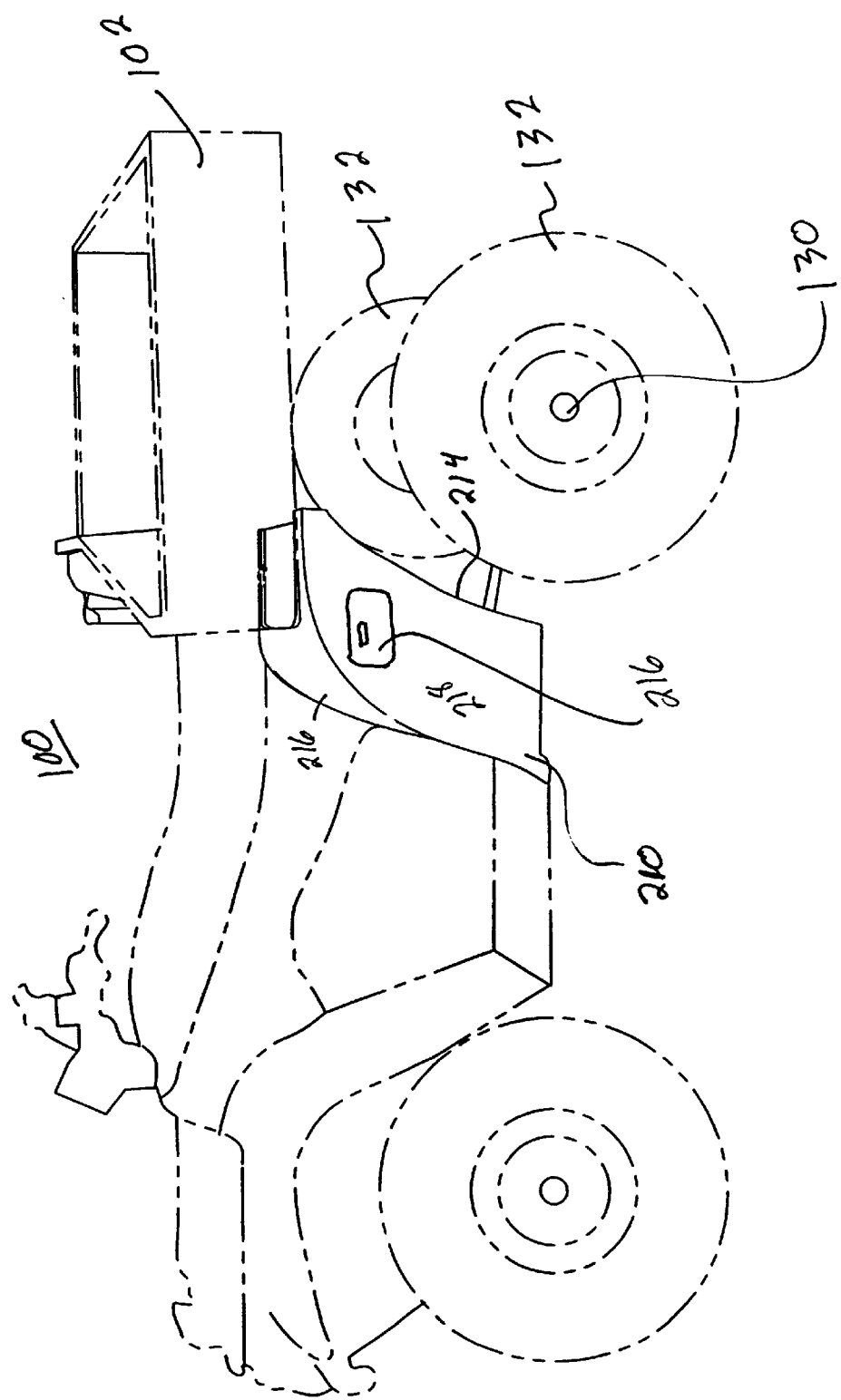
FIG. 2 is a side elevation view of an off-road or all terrain vehicle (shown in phantom) illustrating a rear fender having an access panel located in accordance with an embodiment of the present invention.

As illustrated, the storage fender 110 has a door 116 that permits a driver of the ATV to access the interior of the storage fender 110. Preferably, the door 116 permits the driver to access the interior of the storage fender 110 while the driver is seated on the ATV 100. FIG. 2 illustrates an alternative embodiment having a door 216 located in side panel 118, rather than in curved panel 116. In FIG. 3, a door 316 is located near the top of the curved rear panel 318 while in FIG. 4 a door 416 is seen located further down in the flat or linear rear panel 418. As another alternative, the door 116 can be located within surface 122 (or 422) that forms a top of the storage fender 110 (or 410).

In a preferred embodiment, the door 116 is hinged on one end to permit the door to swing open and shut. The door 116 has a handle 113 for ease of use, and preferably has a suitable latch mechanism on the inner side (unseen) of the door 116. Alternatively, the door 116 can be free of hinges and instead rely on a friction fit to remain within first curved panel 116. While not illustrated in this fashion, the door 116 can also be circular and be threaded for connection to a panel.

The above specification provides an enabling description of the manufacture and use of the invention. Since many embodiments of the invention can be made without departing from the spirit and scope of the invention, the invention resides in the claims hereinafter appended.

We claim:

1. An enclosed storage compartment configured as an off-road vehicle fender, the enclosed storage compartment comprising:

front and rear panels configured to a wheel opening contour, the front and rear panels being spaced apart;

first and second side panels connected to each of the front and rear panels, and at least one of a top panel and a bottom panel, the first and second side panels cooperating with the front and rear panels, and the at least one of a top and bottom panel cooperating with the front and rear panels and the first and second side panels, to form the enclosed storage compartment, wherein at least one of the front and rear panels is curved.

\* \* \* \* \*